US012782783B2

(12) United States Patent
Hao et al.

(10) Patent No.: US 12,782,783 B2
(45) Date of Patent: Nov. 3, 2026

(54) DISPLAY DEVICES AND ARRAY SUBSTRATES

(71) Applicants: Beijing BOE Optoelectronics Technology Co., Ltd., Beijing (CN); BOE Technology Group Co., Ltd., Beijing (CN)

(72) Inventors: Longhu Hao, Beijing (CN); Desheng Wang, Beijing (CN); Zanwu Guo, Beijing (CN); Lingfang Nie, Beijing (CN); Qi Deng, Beijing (CN); Zhichao Yang, Beijing (CN); Yong Zhang, Beijing (CN); Jian Wang, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 389 days.

(21) Appl. No.: 18/567,639

(22) PCT Filed: Nov. 30, 2022

(86) PCT No.: PCT/CN2022/135673

§ 371 (c)(1),
(2) Date: Dec. 6, 2023

(87) PCT Pub. No.: WO2024/113269

PCT Pub. Date: Jun. 6, 2024

(65) Prior Publication Data

US 2025/0085597 A1 Mar. 13, 2025

(51) Int. Cl.
*G02F 1/1362* (2006.01)

(52) U.S. Cl.
CPC .. *G02F 1/136254* (2021.01); *G02F 1/136286* (2013.01)

(58) Field of Classification Search
CPC .................... G02F 1/136254; G02F 1/136286
See application file for complete search history.

(56) References Cited

U.S. PATENT DOCUMENTS

2002/0171790 A1 11/2002 Kim et al.
2017/0352594 A1 12/2017 Choi et al.
(Continued)

FOREIGN PATENT DOCUMENTS

CN 106200161 A 12/2016
CN 106405889 A 2/2017
(Continued)

OTHER PUBLICATIONS

PCT/CN2022/135673 international search report.
PCT/CN2022/135673 Written Opinion.

*Primary Examiner* — Joseph L Williams
(74) *Attorney, Agent, or Firm* — IPro, PLLC

(57) ABSTRACT

The present disclosure provides a display device and an array substrate. The array substrate includes: a substrate, and a pixel circuit, a data signal line, a test pad group, and a test switch circuit that are provided on a side of the substrate, where the data signal line is electrically connected to the pixel circuit, the test pad group is in the chip bonding region, the test switch circuit is in the peripheral region and at a side of the pixel region away from the chip bonding region, and the test switch circuit is configured to connect or disconnect the data signal line and the test pad group.

19 Claims, 7 Drawing Sheets

(56) References Cited

U.S. PATENT DOCUMENTS

| | | | | |
|---|---|---|---|---|
| 2018/0053473 | A1 | 2/2018 | Wang et al. | |
| 2019/0139501 | A1* | 5/2019 | Lin ...................... | G09G 3/3607 |
| 2021/0011325 | A1 | 1/2021 | Yeh et al. | |

FOREIGN PATENT DOCUMENTS

| | | | |
|---|---|---|---|
| CN | 108133693 | A | 6/2018 |
| CN | 110579917 | A | 12/2019 |
| CN | 110646965 | A | 1/2020 |
| CN | 111650788 | A | 9/2020 |
| CN | 112201155 | A | 1/2021 |
| CN | 113448114 | A | 9/2021 |
| CN | 113570989 | A | 10/2021 |
| KR | 20200078829 | A | 7/2020 |

* cited by examiner

DISPLAY DEVICES AND ARRAY SUBSTRATES

CROSS-REFERENCE TO RELATED APPLICATIONS

This application is a national stage of international PCT Application No. PCT/CN2022/135673 filed on Nov. 30, 2022, the entire contents of which are incorporated herein by reference.

TECHNICAL FIELD

The present disclosure relates to a field of display technology, and in particular, to display devices and array substrates.

BACKGROUND

With the progress of the times, a demand for consumer electronics is no longer limited only to their powerful practical functions, and a demand for ultimate appearance of products is increasing. However, some display devices have wider borders.

SUMMARY

A purpose of the present disclosure is to provide a display device and an array substrate, which can achieve narrow borders.

According to an aspect of the present disclosure, there is provided an array substrate, including: a pixel region and a peripheral region surrounding the pixel region, where the peripheral region includes a chip bonding region, and the array substrate includes:

a substrate;

a pixel circuit, a data signal line, a test pad group, and a test switch circuit that are provided on a side of the substrate, where the data signal line is electrically connected with the pixel circuit, the test pad group is in the chip bonding region, the test switch circuit is in the peripheral region and at a side of the pixel region away from the chip bonding region, and the test switch circuit is configured to connect or disconnect the data signal line and the test pad group.

In some examples, the chip bonding region is provided with a chip output pad that is configured to bond to an output port of a chip, and the test pad group is at a side of the chip output pad away from the pixel region.

In some examples, the chip bonding region is provided with a chip input pad that is configured to bond to an input port of the chip, and the chip input pad is between the pixel region and the test pad group.

In some examples, there are a plurality of chip input pads and a plurality of chip output pads, and the chip bonding region is between a first edge and the pixel region of the array substrate;

at least a part of the chip input pads are arranged along an extension direction of the first edge; or at least a part of the chip output pads are arranged along the extension direction of the first edge; or at least a part of the chip input pads and at least a part of the chip output pads are arranged along the extension direction of the first edge.

In some examples, the chip bonding region is provided with a virtual pad that is configured to support the chip, and the virtual pad is at a side of the test pad group away from the pixel region.

In some examples, the chip bonding region is between a first edge and the pixel region of the array substrate, there are a plurality of virtual pads, and at least a part of the virtual pads are arranged along an extension direction of the first edge.

In some examples, the array substrate further includes:

a shielding trace, where some segments of the shielding trace are between the test pad group and the chip output pad.

In some examples, the array substrate further includes:

a gate driver circuit in the peripheral region and electrically connected with the pixel circuit, where the chip output pad includes a gate signal output pad electrically connected with the gate driver circuit and a source signal output pad electrically connected with the pixel circuit, and some segments of the shielding trace are between the gate signal output pad and the source signal output pad.

In some examples, the array substrate further includes:

a common electrode at a side of the pixel circuit away from the substrate and in the pixel region;

a common electrode wire electrically connected with the common electrode, where the shielding trace includes some of the common electrode wire.

In some examples, the array substrate further includes:

a first type test trace electrically connected with the test pad group and the test switch circuit;

a second type test trace electrically connected with the test pad group and the gate signal output pad;

where some regions of the first type test trace and/or the second type test trace are between the test pad group and the chip output pad.

In some examples, at least partial structure of the gate signal output pad, the second type test trace, and the shielding trace are in a same layer, and the array substrate further includes:

a bridging wire at a side of the second type test trace toward or away from the substrate, where an orthographic projection of the bridging wire onto the substrate and an orthographic projection of the shielding trace onto the substrate are crosswise, and the bridging wire is electrically connected with the gate signal output pad and the second type test trace respectively.

In some examples, the chip bonding region is between a first edge and the pixel region of the array substrate, and the array substrate further includes:

a first type test trace including a control signal test line and a plurality of data signal test lines, where the control signal test line and the plurality of data signal test lines are electrically connected with the test pad group, the control signal test line and the plurality of data signal test lines are electrically connected with the test switch circuit, the test switch circuit is configured to cause a data signal test line among the plurality of data signal test lines to be connected to or disconnected the data signal line under control of signals transmitted from the control signal test line, so as to connect or disconnect the data signal line and the test pad group;

where, in an extension direction of the first edge, a part of the plurality of data signal test lines are at a side of the pixel region, and another part of the plurality of data signal test lines are at another side of the pixel region.

In some examples, the data signal test lines include a red image test line, a green image test line, and a blue image test line, and in the extension direction of the first edge, two of the red image test line, the green image test line, and the blue image test line are at a side of the pixel region, and the control signal test line and remaining one of the red image test line, the green image test line, and the blue image test line are at another side of the pixel region.

In some examples, the test switch circuit includes a plurality of test transistors, source electrodes or drain electrodes of the plurality of test transistors are electrically connected with the plurality of data signal test lines correspondingly, and the other of the source electrodes and the drain electrodes of the plurality of test transistors are electrically connected with a plurality of data signal lines correspondingly, gate electrodes of the plurality of test transistors are electrically connected with the control signal test line, and the plurality of test transistors are distributed in the extension direction of the first edge.

In some examples, the chip bonding region is between a first edge and the pixel region of the array substrate, and in an extension direction of the first edge, the pixel region includes two edge pixel regions and an intermediate pixel region between the two edge pixel regions, and the chip bonding region is provided with a chip output pad that is configured to bond to an output port of a chip;

- an end of a data signal line electrically connected to a pixel circuit in an edge pixel region and close to the test switch circuit is electrically connected to the test switch circuit through first fan-out wires, and an end of the data signal line electrically connected to a pixel circuit in an edge pixel region and away from the test switch circuit is electrically connected to the chip output pad through second fan-out wires, where the first fan-out wires are symmetrically arranged to the second fan-out wires.

In some examples, in the extension direction of the first edge, first fan-out wires at a side of the intermediate pixel region are symmetrically arranged to first fan-out wires at another side of the intermediate pixel region, and second fan-out wires at a side of the intermediate pixel region are symmetrically arranged to second fan-out wires at another side of the intermediate pixel region.

In some examples, the test pad group includes a plurality of test pads;

- an area of an orthographic projection of a test pad onto the substrate is larger than an area of an orthographic projection of the chip input pad onto the substrate, and/or
- an area of an orthographic projection of a test pad onto the substrate is larger than an area of an orthographic projection of the chip output pad onto the substrate, and/or
- an area of an orthographic projection of the chip input pad onto the substrate is larger than an area of an orthographic projection of the chip output pad onto the substrate.

According to an aspect of the present disclosure, there is provided a display device, including:

- the array substrate as described above;
- a counter substrate disposed opposite to the array substrate;
- a liquid crystal layer between the array substrate and the counter substrate.

In the display device and the array substrate according to the present disclosure, the test switch circuit is configured to connect or disconnect the data signal line and the test pad group, so that the array substrate can be tested through the test pad group. At the same time, since the test pad group is in the chip bonding region, and the test switch circuit is at a side of the pixel region away from the chip bonding region, compared with the array substrate in related art, the size of the lower border is reduced, achieving a narrow border.

DETAILED DESCRIPTION OF THE EMBODIMENTS

Figure 1:
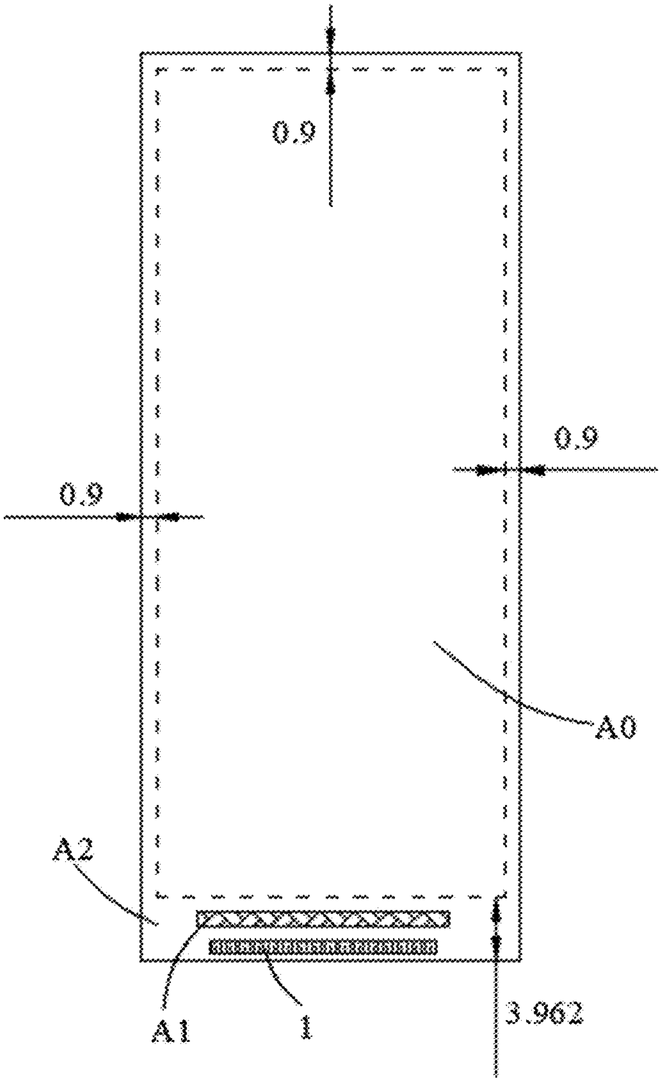
FIG. 1 is a schematic diagram illustrating an array substrate in related art.

Examples will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses consistent with some aspects of the present disclosure as detailed in the appended claims.

The terms used in the present disclosure are for the purpose of describing particular embodiments only, and are not intended to limit the present disclosure. Unless otherwise defined, technical or scientific terms used in this disclosure should have ordinary meaning as understood by one of ordinary skill in the art to which the disclosure belongs. “First”, “second” and similar words used in the specification and claims of the present disclosure do not represent any order, quantity or importance, but are used only to distinguish different components. Likewise, similar words such as “one”, “a” or “an” do not represent a quantity limit, but represent that there is at least one. “Plurality”, “multiple” or “several” means two or more. Unless otherwise indicated, similar words such as “front”, “rear”, “lower” and/or “upper” are only for convenience of description, and are not limited to one position or one spatial orientation. Similar words such as “including” or “comprising” mean that an element or an item appearing before “including” or “comprising” covers elements or items and their equivalents listed after “include” or “comprise”, without excluding other elements or items. Similar words such as “connect” or “connected with each other” are not limited to physical or mechanical connections, and can include electrical connections, whether direct or indirect. Terms determined by "a/an", "the" and "said" in their singular forms in the specification and the appended claims of the present disclosure are also intended to include plural forms unless clearly indicated otherwise in the context. It should also be understood that the term "and/or" as used herein refers to and includes any or all possible combinations of one or more associated listed items.

In related art, as shown in FIG. 1, an array substrate of a display device includes a pixel region A0 and a peripheral region A2 surrounding the pixel region A0. A chip bonding region A1 for bonding chips is in the peripheral region A2 and is disposed separately from the pixel region A0. A test pad group 1 for testing is at a side of the chip bonding region A1 away from the pixel region A0. An upper border, a left border and a right border of the array substrate have a size of 0.9 mm, and a lower border of the array substrate has a size of 3.962 mm. The size of the lower border is larger.

Figure 2:
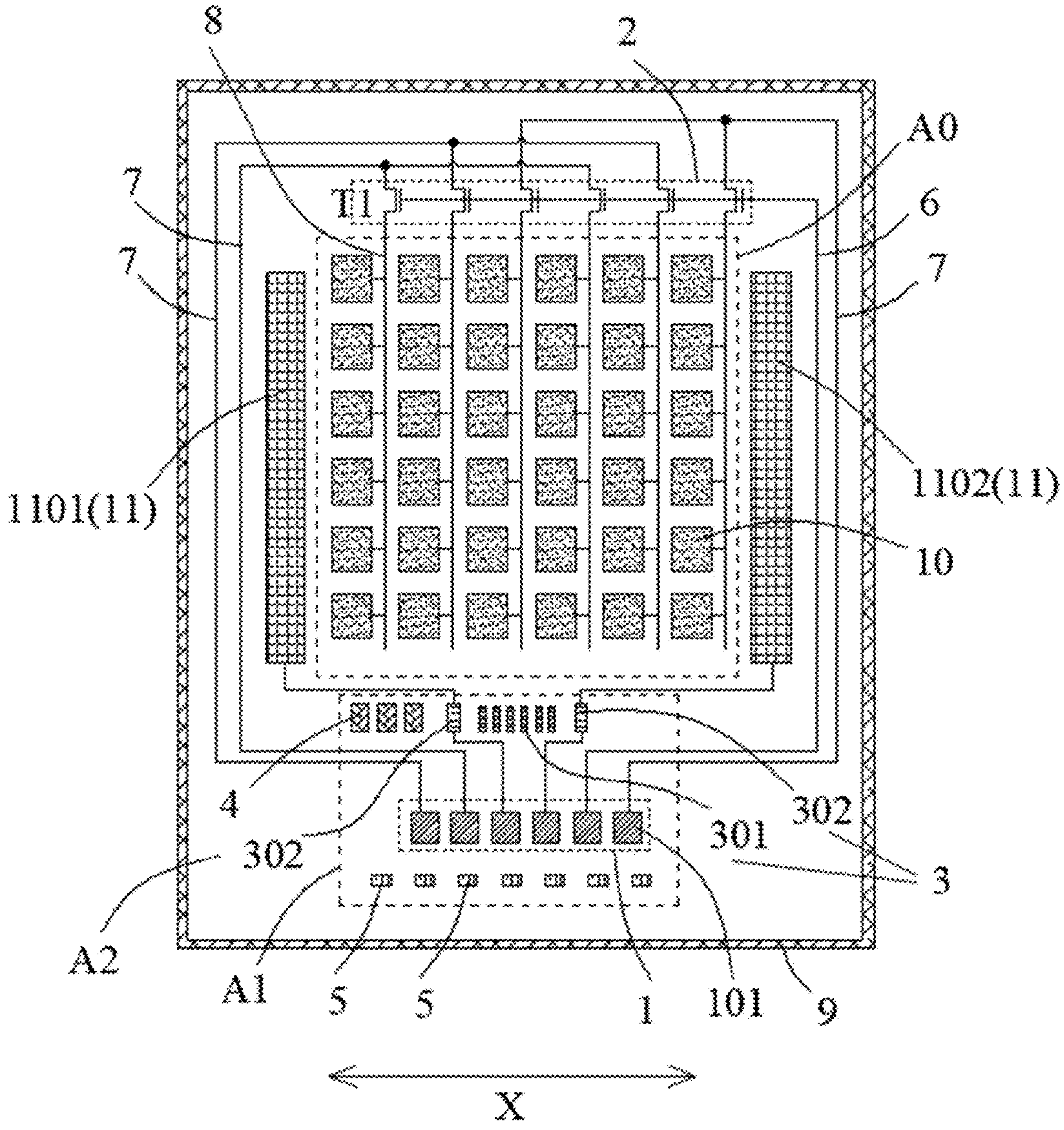
FIG. 2 is a schematic diagram illustrating an array substrate according to embodiments of the present disclosure.

An embodiment of the present disclosure provides an array substrate. As shown in FIG. 2, the array substrate can include a pixel region A0 and a peripheral region A2 surrounding the pixel region A0. The peripheral region A2 can include a chip bonding region A1. The chip bonding region A1 is configured to bond chips, for example, a driver-IC. The chip bonding region A1 can be disposed separately from the pixel region A0, and the chip bonding region A1 can be located between a first edge 9 and the pixel region A0 of the array substrate. The first edge 9 can be an arc-shaped edge, or, be a straight edge.

Figure 3:
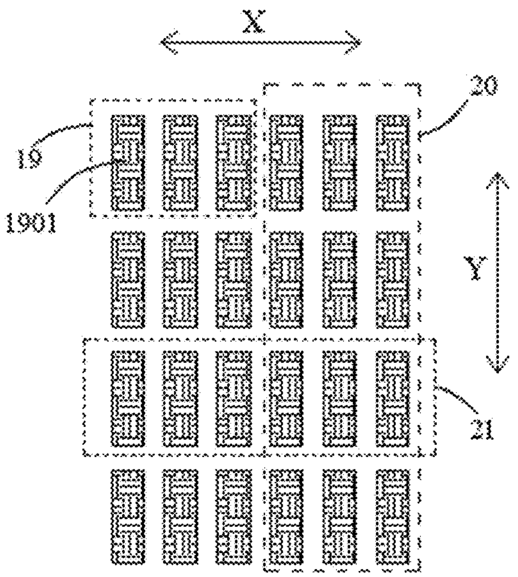
FIG. 3 is a schematic diagram illustrating a pixel distribution according to embodiments of the present disclosure.

As shown in FIG. 3, there are a plurality of pixels 19 in the pixel region A0. One pixel 19 can include a plurality of sub-pixels 1901. In some embodiments, one pixel 19 can include three sub-pixels 1901, for example, a red sub-pixel, a green sub-pixel, and a blue sub-pixel. The three sub-pixels 1901 in one pixel 19 can be sequentially distributed in a first direction (X direction in the figure), or, be sequentially distributed in a second direction (Y direction in the figure), which is not particularly limited in the present disclosure. The first direction can be the same as an extension direction of the first edge 9 which is a straight edge. The first direction can be perpendicular or roughly perpendicular to the second direction. The plurality of pixels 19 can be distributed in an array. In the plurality of pixels 19 distributed in an array, a plurality of pixels 19 distributed in the second direction can form one pixel column 20, and a plurality of pixels 19 distributed in the first direction can form one pixel row 21.

Figure 7:
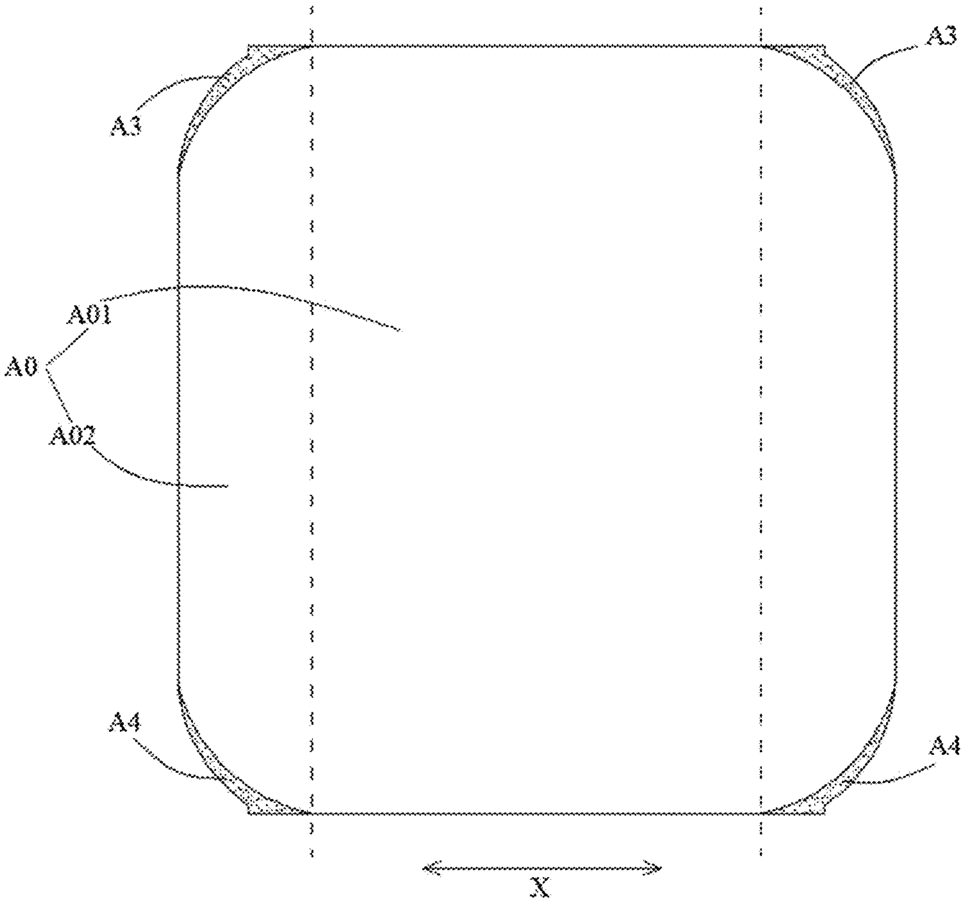
FIG. 7 is a schematic diagram illustrating a distribution of a display region, a first fan-out region, and a second fan-out region of an array substrate according to embodiments of the present disclosure.

The pixel region A0 can have a shape of rectangular, square, circular, elliptical, etc. As shown in FIG. 7, taking the pixel region A0 having a rectangular or square shape as an example, round corners can be formed at four vertices of the pixel region A0. Taking the pixel region A0 with round corners as an example, in the extension direction of the first edge 9 of the array substrate, the pixel region A0 can include two edge pixel regions A02 and an intermediate pixel region A01 between the two edge pixel regions A02. Arcs of the round corners form parts of boundaries of the edge pixel regions A02. For a plurality of pixel columns 20 located in the edge pixel regions A02, in a direction away from the intermediate pixel region A01, a number of pixels 19 in the plurality of pixel columns 20 gradually decreases.

As shown in FIG. 2, the array substrate can include a substrate 24 (see FIG. 5), and a pixel circuit 10, a data signal line 8, a test pad group 1, and a test switch circuit 2 that are provided on a side of the substrate 24.

The pixel circuit 10 is at a side of the substrate 24. The data signal line 8 is at a side of the substrate 24 and is electrically connected to the pixel circuit 10. The test pad group 1 is at a side of the substrate 24 and is in the chip bonding region A1. The test switch circuit 2 is at a side of the substrate 24, and is in the peripheral region A2 and at a side of the pixel region A0 away from the chip bonding region A1. The test switch circuit 2 is configured to connect or disconnect the data signal line 8 from the test pad group 1.

In the array substrate according to the embodiments of the present disclosure, the test switch circuit 2 is configured to connect or disconnect the data signal line 8 from the test pad group 1, so that the array substrate can be tested through the test pad group 1. At the same time, since the test pad group 1 is in the chip bonding region A1, and the test switch circuit 2 is at a side of the pixel region A0 away from the chip bonding region A1, compared with the array substrate in related art, the size of the lower border is reduced, achieving a narrow border.

Each part of the array substrate according to the embodiment of the present disclosure will be described in detail below.

Figure 5:
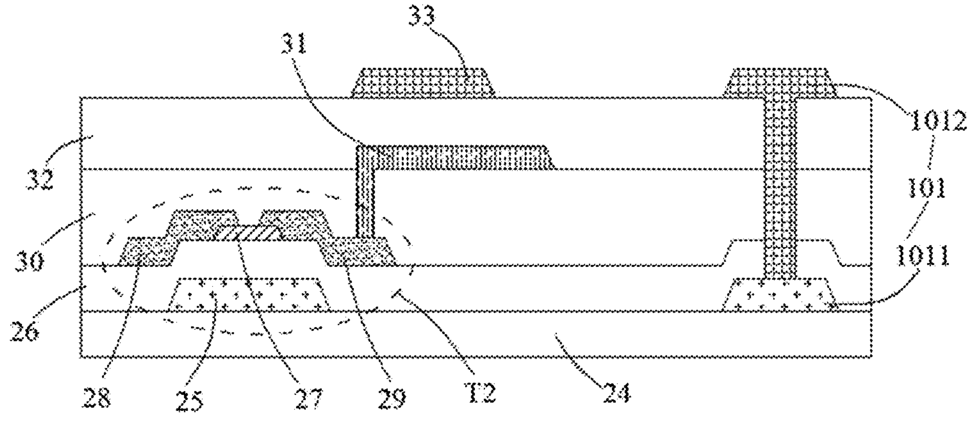
FIG. 5 is a schematic diagram illustrating a cross-sectional distribution of an array substrate according to embodiments of the present disclosure.

As shown in FIG. 5, the substrate 24 can be a rigid substrate. The rigid substrate can be a glass substrate or a PMMA (Polymethyl Methacrylate) substrate or the like. In some embodiments, the substrate 24 can be a flexible substrate.

As shown in FIG. 2, the pixel circuit 10 is at a side of the substrate 24. The pixel circuit 10 can be located in the pixel region A0, which is not limited in the present disclosure. There can be a plurality of pixel circuits 10, which correspond to the plurality of sub-pixels 1901 one to one. The plurality of pixel circuits 10 can be distributed in an array. In the plurality of pixel circuits 10 distributed in an array, a plurality of pixel circuits 10 distributed in the second direction can form one circuit column, and a plurality of pixel circuits 10 distributed in the first direction can form one circuit row.

As shown in FIG. 2, the data signal line 8 can be at a side of the substrate 24 and is electrically connected to the pixel circuit 10. A plurality of pixel circuits 10 in one circuit column can be connected to a same data signal line 8. Further, there can be a plurality of data signal lines 8, and the plurality of data signal lines 8 can correspond to a plurality of circuit columns one to one. The data signal lines 8 and the circuit columns can be arranged in an alternated manner in the first direction, and a plurality of pixel circuits 10 in each circuit column are electrically connected to a corresponding data signal line 8.

The array substrate in the present disclosure can further include a scan signal line. The scan signal line can be at a side of the substrate 24 and is electrically connected to the pixel circuit 10. A plurality of pixel circuits 10 in one circuit row can be connected to a same scan signal line. Further, there can be a plurality of scan signal lines, and the plurality of scan signal lines can correspond to a plurality of circuit rows one to one. The scan signal lines and the circuit rows can be arranged in an alternated manner in the second direction, and a plurality of pixel circuits 10 in each circuit row are electrically connected to a corresponding scan signal line.

As shown in FIG. 5, the pixel circuit 10 can include a switch transistor T2. The switch transistor T2 can be a thin film transistor. The switch transistor T2 can include a gate electrode 25, a first source-drain electrode 28, and a second source-drain electrode 29. One of the first source-drain electrode 28 and the second source-drain electrode 29 is a source electrode, and another one thereof is a drain electrode. The gate electrode 25 of the switch transistor T2 can be at a side of the substrate 24. The scan signal line can be in a same layer as the gate electrode 25 of the switch transistor T2 and is electrically connected to the gate electrode 25. The first source-drain electrode 28 and the second source-drain electrode 29 of the switch transistor T2 can be in a same layer and are at a side of the gate electrode 25 of the switch transistor T2 away from the substrate 24. The data signal line 8 can be in a same layer as the first source-drain electrode 28 of the switch transistor T2 and is electrically connected to the first source-drain electrode 28. The switch transistor T2 can further include an active layer 27 and a gate insulation layer 26. Taking the switch transistor T2 that is a bottom-gate type thin film transistor as an example, the active layer 27 of the switch transistor T2 can be at a side of the gate electrode 25 of the switch transistor T2 away from the substrate 24, the gate insulation layer 26 can be at a side of the active layer 27 of the switch transistor T2 away from the substrate 24, and the first source-drain electrode 28 and the second source-drain electrode 29 of the switch transistor T2 can be at a side of the active layer 27 away from the substrate 24. In other embodiments, the switch transistor T2 can be a top-gate type thin film transistor.

As shown in FIG. 5, the array substrate in the present disclosure can further include a first insulation layer 30, a pixel electrode 31, a second insulation layer 32, and a common electrode 33. The pixel electrode 31 can be in the pixel region A0. The common electrode 33 can be in the pixel region A0. There can be a plurality of pixel electrodes 31, and the plurality of pixel electrodes 31 can correspond to a plurality of pixel circuits 10 one to one. The first insulation layer 30 can be at a side of the second source-drain electrode 29 of the switch transistor T2 away from the substrate 24. The pixel electrode 31 and the common electrode 33 can be at a side of the first insulation layer 30 away from the substrate 24. The common electrode 33 can be at a side of the pixel electrode 31 away from the substrate 24, the second insulation layer 32 is between the common electrode 33 and the pixel electrode 31, and the pixel electrode 31 is electrically connected to the second source-drain electrode 29 of the switch transistor T2. In other embodiments, the common electrode 33 can be at a side of the pixel electrode 31 toward the substrate 24. In addition, a multi-dimensional or horizontal electric field, that is, an electric field in an ADS (Advanced Super Dimension Switch) or IPS (In-Plane Switching) mode can be generated between the common electrode 33 and the pixel electrode 31.

As shown in FIG. 2, the array substrate in the present disclosure can further include a gate driver circuit 11. The gate driver circuit 11 can include a plurality of shift registers which are cascaded. The gate driver circuit 11 can be disposed in the peripheral region A2, and signal output ends of the shift registers can be electrically connected to the scan signal line for transmitting signals to the scan signal line. The gate driver circuit 11 can include a first driver circuit 1101 and a second driver circuit 1102. The first driver circuit 1101 and the second driver circuit 1102 are respectively at both sides of the pixel region A0 correspondingly one to one in the first direction. In the plurality of scan signal lines, a part of the scan signal lines are electrically connected to the first driver circuit 1101, and another part of the scan signal lines are electrically connected to the second driver circuit 1102.

Figure 4:
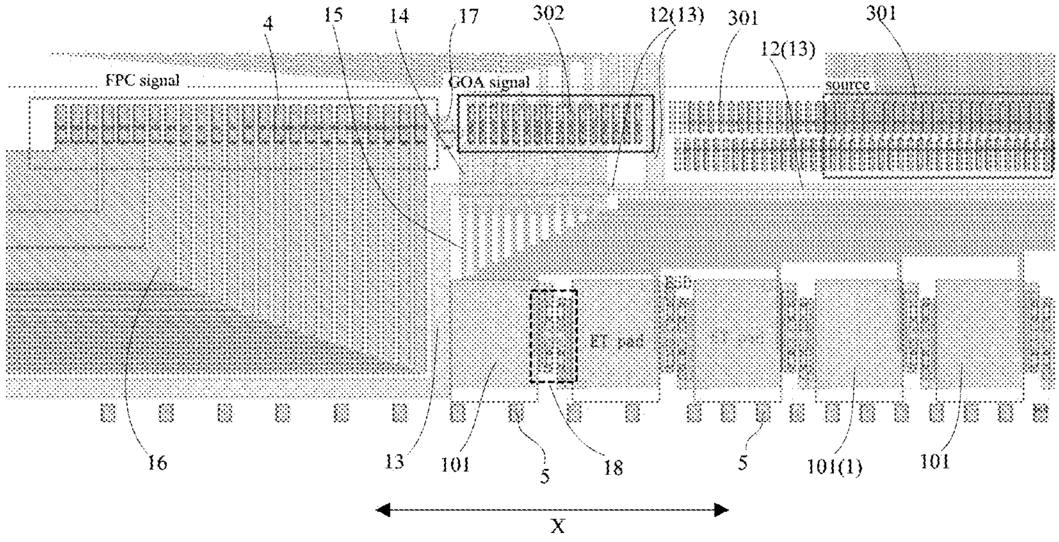
FIG. 4 is a schematic diagram illustrating a part of an array substrate according to embodiments of the present disclosure.

As shown in FIG. 2 and FIG. 4, the chip bonding region A1 can be provided with a chip output pad 3 and a chip input pad 4. In a chip bonding process, the chip output pad 3 can be bonded to an output port of the chip, that is, the chip output pad 3 can receive signals output from the output port of the chip; the chip input pad 4 can be bonded to an input port of the chip, that is, the chip input pad 4 can transmit signals to the input port of the chip. In addition, an alignment mark 17 is provided between the chip input pad 4 and the chip output pad 3 and is configured for alignment when a circuit board is bonded.

As shown in FIG. 2 and FIG. 4, there are a plurality of chip output pads 3, and at least a part of the chip output pads 3 are arranged along the extension direction of the first edge 9, which can reduce a border width. The plurality of chip output pads 3 can include a plurality of source signal output pads 301. In some embodiments, the array substrate can include two pad rows. Each of the pad rows includes a plurality of source signal output pads 301 sequentially distributed in the first direction, and the source signal output pads 301 in the two pad rows can be arranged in a staggered manner. The source signal output pads 301 can be electrically connected to the data signal line 8, so that a chip can transmit signals to the data signal line 8 through the source signal output pads 301. The plurality of chip output pads 3 can further include a plurality of gate signal output pads 302. The plurality of gate signal output pads 302 can be sequentially distributed in the first direction. The gate signal output pads 302 can be electrically connected to the gate driver circuit 11. An area of an orthographic projection of a gate signal output pad 302 onto the substrate 24 can be larger than an area of an orthographic projection of a source signal output pad 301 onto the substrate 24.

The chip output pad 3 can include a first output pad layer, and a second output pad layer connected with the first output pad layer through a via-hole. The first output pad layer can be in a same layer as the gate electrode 25 of the switch transistor T2 (see FIG. 5), and the second output pad layer can be in a same layer as the common electrode 33 (see FIG. 5) or the pixel electrode 31.

In some examples, the chip output pad 3 can be a third output pad layer and a second output pad layer that are electrically connected to each other. The third output pad layer can be in a same layer as the source-drain electrode of the switch transistor T2, and the second output pad layer can be in a same layer as the common electrode 33 or the pixel electrode 31.

In some examples, the chip output pad 3 can be a first output pad layer, a second output pad layer, and a third output pad layer that are electrically connected to each other. The first output pad layer can be in a same layer as the gate electrode 25 of the switch transistor T2, the third output pad layer can be in a same layer as the source-drain electrode of the switch transistor T2, and the second output pad layer can be in a same layer as the common electrode 33 or the pixel electrode 31.

As shown in FIG. 2 and FIG. 4, there can be a plurality of chip input pads 4, and at least a part of the chip input pads 4 are arranged along the extension direction of the first edge 9, which can reduce a border width. Further, at least a part of the chip input pads 4 and at least a part of the chip output pads 3 are arranged along the extension direction of the first edge 9. The chip input pad 4 can be electrically connected to the circuit board, so that the circuit board input signals to a chip through the chip input pad. The chip input pad 4 can be electrically connected to the circuit board through a circuit board connection trace 16. An area of an orthographic projection of a chip input pad 4 onto the substrate 24 can be larger than an area of an orthographic projection of a chip output pad 3 onto the substrate 24, that is, the area of the orthographic projection of the chip input pad 4 onto the substrate 24 can be larger than the area of the orthographic projection of a gate signal output pad 302 onto the substrate 24.

The chip input pad 4 can include a first input pad layer, and a second input pad layer connected with the first input pad layer through a via-hole. The first input pad layer can be disposed in a same layer as the gate electrode 25 of the switch transistor T2 (see FIG. 5), and the second input pad layer can be disposed in a same layer as the common electrode 33 (see FIG. 5). Further, the chip input pad 4 can further include a third input pad layer. The third input pad layer can be disposed in a same layer as the first source-drain electrode 28 of the switch transistor T2 (see FIG. 5), and the third input pad layer is electrically connected to the first input pad layer and the second input pad layer.

As shown in FIG. 2 and FIG. 4, the chip bonding region A1 can be provided with a virtual pad 5. The virtual pad 5 can be located between the chip input pad 4 and the first edge 9, and/or, the virtual pad 5 can be located between the chip output pad 3 and the first edge 9. The virtual pad 5 is configured to support a chip in a chip bonding process, and the virtual pad 5 does not receive signals. There can be a plurality of virtual pads 5, and at least a part of the virtual pads 5 are arranged along the extension direction of the first edge 9.

As shown in FIG. 2 and FIG. 4, the test pad group 1 is at a side of the substrate 24 and is in the chip bonding region A1. The test pad group 1 can be at a side of the chip output pad 3 away from the pixel region A0. The chip input pad 4 is between the pixel region A0 and the test pad group 1, and the virtual pad 5 can be at a side of the test pad group 1 away from the pixel region A0. The test pad group 1 can include a plurality of test pads 101. The plurality of test pads 101 can be distributed in the extension direction of the first edge 9 of the array substrate. An area of an orthographic projection of a test pad 101 onto the substrate 24 can be larger than an area of an orthographic projection of a chip input pad 4 onto the substrate 24, and the area of the orthographic projection of the test pad 101 onto the substrate 24 can be larger than an area of an orthographic projection of a chip output pad 3 onto the substrate 24. In addition, between two adjacent test pads 101, a first anti-static structure 18 connected with the test pads 101 can be disposed.

As shown in FIG. 5, the test pad 101 can include a first test pad layer 1011, and the first test pad layer 1011 can be in a same layer as the gate electrode 25 of the switch transistor T2, which is not limited in the present disclosure. Further, the test pad 101 in the present disclosure can further include a second test pad layer 1012. The second test pad layer 1012 can be in a same layer as the common electrode 33, and the second test pad layer 1012 is connected with the first test pad layer 1011 through a via-hole. A material for the second test pad layer 1012 can include indium tin oxide (ITO), etc.

Figure 6:
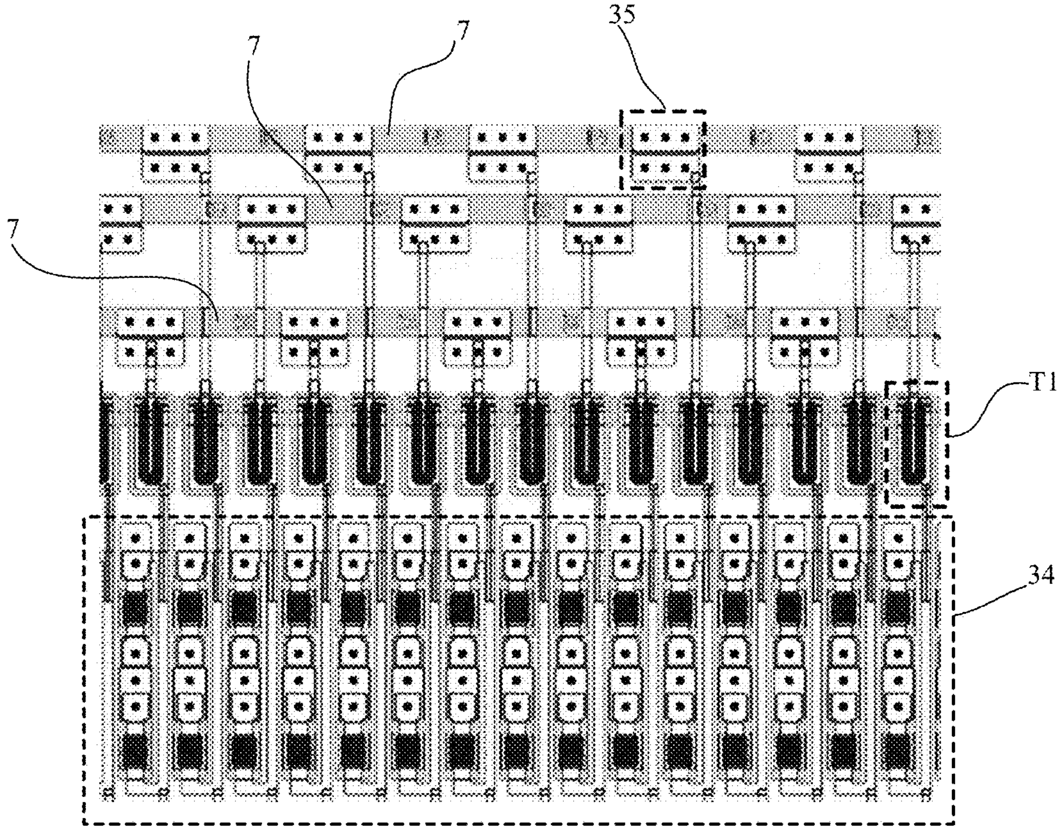
FIG. 6 is a schematic diagram illustrating another part of an array substrate according to embodiments of the present disclosure.

As shown in FIG. 2, the test switch circuit 2 is at a side of the substrate 24, and is in the peripheral region A2 and at a side of the pixel region A0 away from the chip bonding region A1. As shown in FIG. 2 and FIG. 6, the test switch circuit 2 can include a plurality of test transistors T1. The plurality of test transistors T1 can be distributed in the first direction. The plurality of test transistors T1 can correspond to a plurality of data signal lines 8 one to one, which is not limited in the present disclosure. The plurality of test transistors T1 can include a plurality of red image transistors, a plurality of blue image transistors, and a plurality of green image transistors. A red image transistor can be electrically connected to a pixel circuit 10 corresponding to a red sub-pixel through a data signal line 8, a green image transistor can be electrically connected to a pixel circuit 10 corresponding to a green sub-pixel through a data signal line 8, and a blue image transistor can be electrically connected to a pixel circuit 10 corresponding to a blue sub-pixel through a data signal line 8. In addition, the plurality of test transistors T1 distributed in the first direction can include a plurality of transistor groups, and the plurality of transistor groups are sequentially distributed in the first direction. Each of the transistor groups can include a red image transistor, a green image transistor, and a blue image transistor distributed in the first direction. In addition, as shown in FIG. 6, a test transistor T1 can be electrically connected to a data signal line 8 through a second anti-static structure 34.

The array substrate can further include a first type test trace. The first type test trace can be in a same layer as the gate electrode 25 of the switch transistor T2. Some regions of the first type test trace are between the test pad group 1 and the chip output pad 3. A part of the plurality of test pads 101 can be electrically connected to the test switch circuit 2 through the first type test trace. As shown in FIG. 2 and FIG. 6, the first type test trace can include a plurality of data signal test lines 7 and a control signal test line 6. The control signal test line 6 and the plurality of data signal test lines 7 are electrically connected to the test pad group 1. The control signal test line 6 and the plurality of data signal test lines 7 are electrically connected to the test switch circuit 2. The test switch circuit 2 is configured to cause a data signal test line among the plurality of data signal test lines 7 to be connected to or disconnected a data signal line 8 under control of signals transmitted from the control signal test line 6, so as to connect or disconnect the data signal line 8 from the test pad group 1. A gate electrode of the test transistor T1 in the test switch circuit 2 can be in a same layer as the gate electrode 25 of the switch transistor T2, and a source electrode and a drain electrode of the test transistor T1 can be in a same layer as the source electrode of the switch transistor T2. As shown in FIG. 6, the array substrate in the present disclosure can further include a conductive connection block 35. The conductive connection block 35 can be in a same layer as the source electrode and the drain electrode of the test transistor T1 and is electrically connected to one of the source electrode and the drain electrode of the test transistor T1. The data signal test line 7 is in a same layer as the gate electrode of the switch transistor T2 and is connected with the conductive connection block 35 through a via-hole, so that the data signal test line 7 is electrically connected to the test transistor T1.

A number of the data signal test lines 7 can be the same as a number of the sub-pixels 1901 in one pixel 19, for example, three. Taking one pixel 19 that includes a red sub-pixel, a green sub-pixel, and a blue sub-pixel as an example, three data signal test lines 7 can include a red image test line, a green image test line, and a blue image test line. There can be one control signal test line 6. Since there are three data signal test lines 7, the first type test trace includes four traces. One of a source electrode and a drain electrode of the red image transistor can be electrically connected to the red image test line, and another one of the source electrode and the drain electrode of the red image transistor can be electrically connected to a data signal line 8; one of a source electrode and a drain electrode of the blue image transistor can be electrically connected to the blue image test line, and another one of the source electrode and the drain electrode of the blue image transistor can be electrically connected to a data signal line 8; one of a source electrode and a drain electrode of the green image transistor can be electrically connected to the green image test line, and another one of the source electrode and the drain electrode of the green image transistor can be electrically connected to a data signal line 8; gate electrodes of the red image transistor, the blue image transistor, and the green image transistor are electrically connected to the control signal test line 6.

In addition, as shown in FIG. 2, in the extension direction of the first edge 9, a part of the plurality of data signal test lines 7 are at a side of the pixel region A0, and another part of the data signal test lines 7 are at another side of the pixel region A0. In some embodiments, two of the red image test line, the green image test line, and the blue image test line are at a side of the pixel region A0, and where the control signal test line 6 and the remaining one of the red image test line, the green image test line, and the blue image test line is at another side of the pixel region A0.

Figure 8:
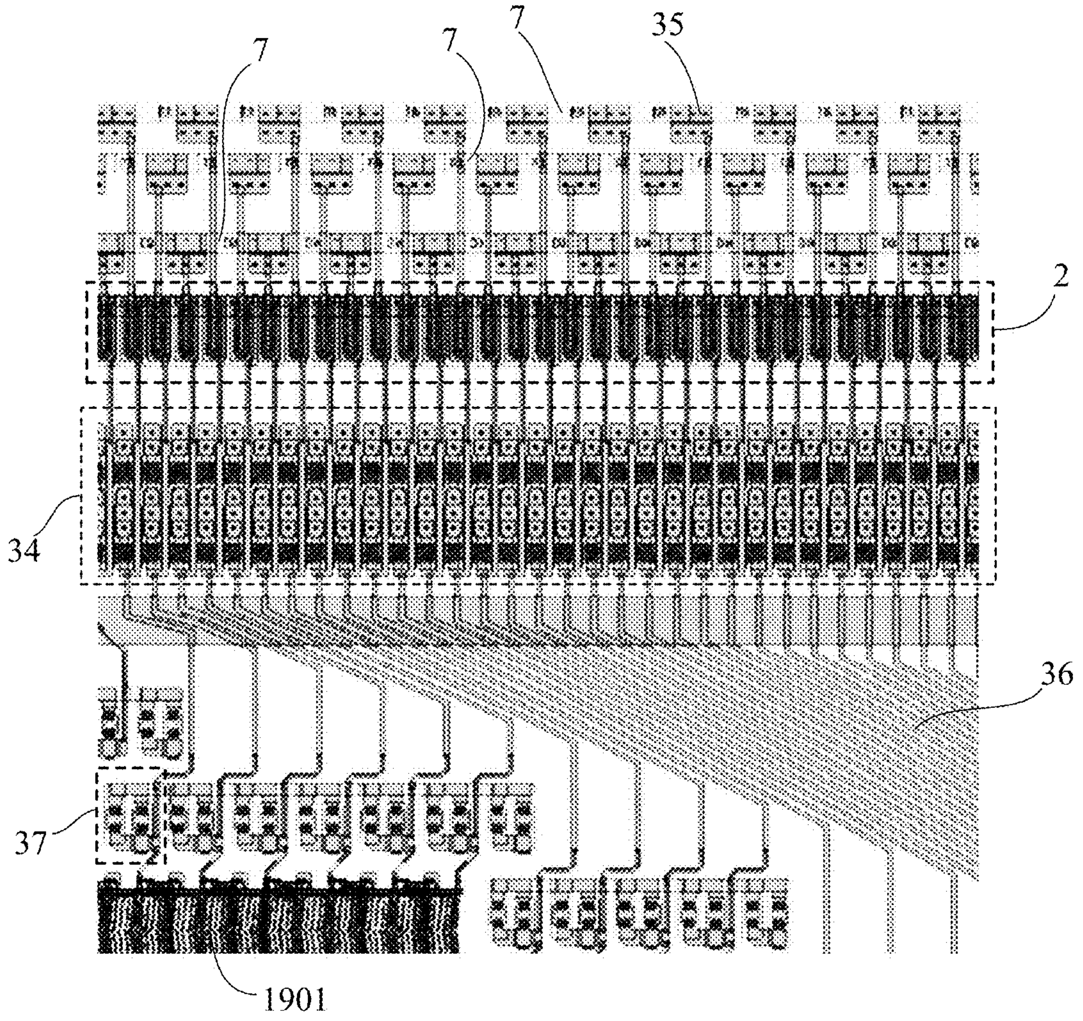
FIG. 8 is a schematic diagram illustrating another part of an array substrate according to embodiments of the present disclosure.

As shown in FIG. 7 and FIG. 8, taking the pixel region A0 that includes two edge pixel regions A02 and an intermediate pixel region A01 located between the two edge pixel regions A02 as an example, an end of a data signal line 8 electrically connected to a pixel circuit 10 in an edge pixel region A02 and close to the test switch circuit 2 is electrically connected to the test switch circuit 2 through first fan-out wires 36, and an end of the data signal line 8 electrically connected to a pixel circuit 10 in an edge pixel region A02 and away from the test switch circuit 2 is electrically connected to the chip output pad 3 through second fan-out wires. The first fan-out wires 36 are symmetrically arranged to the second fan-out wires. Further, in the extension direction of the first edge 9, first fan-out wires 36 at a side of the intermediate pixel region A01 are symmetrically arranged to first fan-out wires 36 at another side of the intermediate pixel region A01, and second fan-out wires at a side of the intermediate pixel region A01 are symmetrically arranged to second fan-out wires at another side of the intermediate pixel region A01. Such configuration is helpful to ultimate symmetrical design of borders. As shown in FIG. 7, there are a plurality of first fan-out wires 36, which are located in first fan-out regions A3, and there are a plurality of second fan-out wires, which are located in second fan-out regions A4. In addition, as shown in FIG. 8, an end of the respective first fan-out wires 36 is electrically connected to the test switch circuit 2 through the second anti-static structure 34, and another end of the respective first fan-out wires 36 is electrically connected to a data signal line 8 through a third anti-static structure 37.

As shown in FIG. 2 and FIG. 4, the array substrate can further include a second type test trace 15. The second type test trace 15 can be in a same layer as the gate electrode 25 of the switch transistor T2. Some regions of the second type test trace 15 are between the test pad group 1 and the chip output pad 3. Some test pads 101 of the plurality of test pads 101 can be electrically connected to gate signal output pads 302 through the second type test trace 15.

As shown in FIG. 4, the array substrate in the present disclosure can further include a shielding trace 12. Some of the shielding trace 12 can be located between the test pad group 1 and the chip output pad 3, so as to reduce signal interference between the test pad group 1 and the chip output pad 3. In addition, some of the shielding trace 12 can be located between the gate signal output pad 302 and the source signal output pad 301, so as to reduce signal interference between the gate signal output pad 302 and the source signal output pad 301. The shielding trace 12 can be in a same layer as the gate electrode 25 of the switch transistor T2. Taking the second type test trace 15 that are disposed in a same layer as the gate electrode 25 of the switch transistor T2 as an example, the array substrate can further include a bridging wire 14, which is at a side of the second type test trace 15 toward or away from the substrate 24. An orthographic projection of the bridging wire 14 onto the substrate 24 and an orthographic projection of the shielding trace 12 onto the substrate 24 are crosswise. The bridging wire 14 is electrically connected to the gate signal output pad 302 and the second type test trace 15 respectively. For example, the bridging wire 14 can be disposed in a same layer as the data signal line 8. A material for the bridging wire 14 can include indium tin oxide (ITO), etc.

The array substrate in the present disclosure can further include a circuit board. The circuit board can be electrically connected to the chip input pads 4. The array substrate in the present disclosure can further include a common 13. The common electrode wire 13 can be electrically connected to the common electrode 33 and the circuit board, so that the circuit board outputs voltage signals to the common electrode 33 through the common electrode wire 13. The shielding trace 12 can include some of the common electrode wire 13, which is not limited in the present disclosure.

Figure 9:
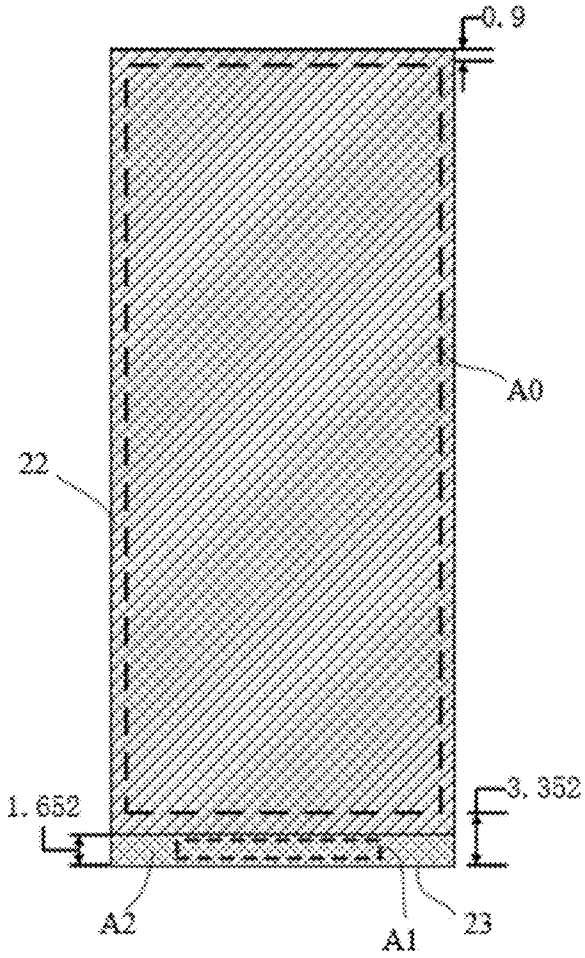
FIG. 9 is a schematic diagram illustrating an array substrate and a color film baseplate according to embodiments of the present disclosure.

An embodiment of the present disclosure provides a display device. The display device can include an array substrate according to any one of the above embodiments, a counter substrate, and a liquid crystal layer. The counter substrate is disposed opposite to the array substrate, and the liquid crystal layer can be disposed between the array substrate and the counter substrate. The counter substrate can be a color film baseplate 22 (see FIG. 9). For the display device in the present disclosure, there is a certain distance between a lower edge of the color film baseplate 22 and a lower edge (the first edge 9) of the array substrate 23, for example, a distance of 3.352 mm. In addition, for the array substrate 23 in the present disclosure, in a case where its lower border is extremely narrow, its upper border will not be excessively widened. For example, the upper border of the array substrate 23 (a distance between an upper edge of the pixel region A0 and an upper edge of the array substrate 23) can be of 0.9 mm, and the lower border of the array substrate 23 (a distance between a lower edge of the pixel region A0 and a lower edge of the array substrate 23) can be of 1.652 mm. The display device in the present disclosure can be any product or component with a display function, such as a mobile phone, a tablet computer, a television, a monitor, a notebook computer, a digital photo frame, or a navigator.

The display device and the array substrate provided in the embodiments of the present disclosure belong to a same inventive concept, and for their relevant details and beneficial effects, reference can be made to each other, without further elaboration.

The above are embodiments of the present disclosure, which are not intended to make any formal limitation on the disclosure. Although the present disclosure has been disclosed as above in the embodiments, these embodiments are not intended to limit the present disclosure, and any person skilled in the art, without departing from the scope of the technical solutions of the present disclosure, can make some changes or modifications to the technical contents disclosed above as equivalent embodiments with equivalent changes. However, without departing from the contents of the technical solutions of the present disclosure, any simple revisions, equivalent changes and modifications made to the above embodiments based on the technical essence of the present disclosure still fall within the scope of the technical solutions of the present disclosure.

The invention claimed is:

1. An array substrate, comprising: a pixel region and a peripheral region surrounding the pixel region, wherein the peripheral region comprises a chip bonding region, and wherein the array substrate comprises:

a substrate;

a pixel circuit, a data signal line, a test pad group, and a test switch circuit that are provided on a side of the substrate, wherein the data signal line is electrically connected with the pixel circuit, the test pad group is in the chip bonding region, the test switch circuit is in the peripheral region and at a side of the pixel region away from the chip bonding region, and the test switch circuit is configured to connect or disconnect the data signal line and the test pad group;

wherein the chip bonding region is provided with a chip output pad that is configured to bond to an output port of a chip, and wherein the test pad group is at a side of the chip output pad away from the pixel region.

2. The array substrate according to claim 1, wherein the chip bonding region is provided with a chip input pad that is configured to bond to an input port of the chip, and wherein the chip input pad is between the pixel region and the test pad group.

3. The array substrate according to claim 2, wherein there are a plurality of chip input pads and a plurality of chip output pads, and wherein the chip bonding region is between a first edge and the pixel region of the array substrate;

at least a part of the chip input pads are arranged along an extension direction of the first edge; or at least a part of the chip output pads are arranged along the extension direction of the first edge; or at least a part of the chip input pads and at least a part of the chip output pads are arranged along the extension direction of the first edge.

4. The array substrate according to claim 2, wherein the test pad group comprises a plurality of test pads; wherein at least one of:

an area of an orthographic projection of a test pad onto the substrate is larger than an area of an orthographic projection of the chip input pad onto the substrate, an area of an orthographic projection of a test pad onto the substrate is larger than an area of an orthographic projection of the chip output pad onto the substrate, an area of an orthographic projection of the chip input pad onto the substrate is larger than an area of an orthographic projection of the chip output pad onto the substrate.

5. The array substrate according to claim 1, wherein the chip bonding region is provided with a virtual pad that is configured to support the chip, and wherein the virtual pad is at a side of the test pad group away from the pixel region.

6. The array substrate according to claim 5, wherein the chip bonding region is between a first edge and the pixel region of the array substrate, wherein there are a plurality of virtual pads, and wherein at least a part of the virtual pads are arranged along an extension direction of the first edge.

7. The array substrate according to claim 1, further comprising:

a shielding trace, wherein some segments of the shielding trace are between the test pad group and the chip output pad.

8. The array substrate according to claim 7, further comprising:

a gate driver circuit in the peripheral region and electrically connected with the pixel circuit, wherein the chip output pad comprises a gate signal output pad electrically connected with the gate driver circuit and a source signal output pad electrically connected with the pixel circuit, and wherein some segments of the shielding trace are between the gate signal output pad and the source signal output pad.

9. The array substrate according to claim 8, further comprising:

a first type test trace electrically connected with the test pad group and the test switch circuit;

a second type test trace electrically connected with the test pad group and the gate signal output pad;

wherein some regions of the first type test trace, the second type test trace, or both are between the test pad group and the chip output pad.

10. The array substrate according to claim 9, wherein, the second type test trace, the shielding trace and at least partial structure of the gate signal output pad are in a same layer, and the array substrate further comprises:

a bridging wire at a side of the second type test trace toward or away from the substrate, wherein an orthographic projection of the bridging wire onto the substrate and an orthographic projection of the shielding trace onto the substrate are crosswise, and the bridging wire is electrically connected with the gate signal output pad and the second type test trace respectively.

11. The array substrate according to claim 7, further comprising:

a common electrode at a side of the pixel circuit away from the substrate and in the pixel region;

a common electrode wire electrically connected with the common electrode, wherein the shielding trace comprises some of the common electrode wire.

12. The array substrate according to claim 1, wherein the chip bonding region is between a first edge and the pixel region of the array substrate, and the array substrate further comprises:

a first type test trace comprising a control signal test line and a plurality of data signal test lines, wherein the control signal test line and the plurality of data signal test lines are electrically connected with the test pad group, the control signal test line and the plurality of data signal test lines are electrically connected with the test switch circuit, the test switch circuit is configured to cause a data signal test line among the plurality of data signal test lines to be connected to or disconnected the data signal line under control of signals transmitted from the control signal test line, so as to connect or disconnect the data signal line and the test pad group;

wherein, in an extension direction of the first edge, a part of the plurality of data signal test lines are at a side of the pixel region, and another part of the plurality of data signal test lines are at another side of the pixel region.

13. The array substrate according to claim 12, wherein the data signal test lines comprise a red image test line, a green image test line, and a blue image test line, and in the extension direction of the first edge, two of the red image test line, the green image test line, and the blue image test line are at a side of the pixel region, and the control signal test line and remaining one of the red image test line, the green image test line, and the blue image test line are at another side of the pixel region.

14. The array substrate according to claim 12, wherein the test switch circuit comprises a plurality of test transistors, source electrodes or drain electrodes of the plurality of test transistors are electrically connected with the plurality of data signal test lines correspondingly, and the other of the source electrodes and the drain electrodes of the plurality of test transistors are electrically connected with a plurality of data signal lines correspondingly, gate electrodes of the plurality of test transistors are electrically connected with the control signal test line, and the plurality of test transistors are distributed in the extension direction of the first edge.

15. The array substrate according to claim 1, wherein the chip bonding region is between a first edge and the pixel region of the array substrate, and in an extension direction of the first edge, the pixel region comprises two edge pixel regions and an intermediate pixel region between the two edge pixel regions, and the chip bonding region is provided with a chip output pad that is configured to bond to an output port of a chip;

an end of a data signal line electrically connected to a pixel circuit in an edge pixel region and close to the test switch circuit is electrically connected to the test switch circuit through first fan-out wires, and an end of the data signal line electrically connected to a pixel circuit in an edge pixel region and away from the test switch circuit is electrically connected to the chip output pad through second fan-out wires, wherein the first fan-out wires are symmetrically arranged to the second fan-out wires.

16. The array substrate according to claim 15, wherein, in the extension direction of the first edge, first fan-out wires at a side of the intermediate pixel region are symmetrically arranged to first fan-out wires at another side of the intermediate pixel region, and second fan-out wires at a side of the intermediate pixel region are symmetrically arranged to second fan-out wires at another side of the intermediate pixel region.

17. A display device, comprising:

an array substrate according to claim 1;

a counter substrate disposed opposite to the array substrate;

a liquid crystal layer between the array substrate and the counter substrate.

18. An array substrate, comprising: a pixel region and a peripheral region surrounding the pixel region, wherein the peripheral region comprises a chip bonding region, and wherein the array substrate comprises:

a substrate;

a pixel circuit, a data signal line, a test pad group, and a test switch circuit that are provided on a side of the substrate, wherein the data signal line is electrically connected with the pixel circuit, the test pad group is in the chip bonding region, the test switch circuit is in the peripheral region and at a side of the pixel region away from the chip bonding region, and the test switch circuit is configured to connect or disconnect the data signal line and the test pad group;

wherein the chip bonding region is between a first edge and the pixel region of the array substrate, and in an extension direction of the first edge, the pixel region comprises two edge pixel regions and an intermediate pixel region between the two edge pixel regions, and the chip bonding region is provided with a chip output pad that is configured to bond to an output port of a chip;

an end of a data signal line electrically connected to a pixel circuit in an edge pixel region and close to the test switch circuit is electrically connected to the test switch circuit through first fan-out wires, and an end of the data signal line electrically connected to a pixel circuit in an edge pixel region and away from the test switch circuit is electrically connected to the chip output pad through second fan-out wires, wherein the first fan-out wires are symmetrically arranged to the second fan-out wires.

19. The array substrate according to claim 18, wherein, in the extension direction of the first edge, first fan-out wires at a side of the intermediate pixel region are symmetrically arranged to first fan-out wires at another side of the intermediate pixel region, and second fan-out wires at a side of the intermediate pixel region are symmetrically arranged to second fan-out wires at another side of the intermediate pixel region.

* * * * *